United States Patent
Iwai

(10) Patent No.: US 8,496,036 B2
(45) Date of Patent: Jul. 30, 2013

(54) PNEUMATIC TIRE WITH TREAD HAVING CENTER RIB, CURVED OBLIQUE GROOVES AND CONNECTING GROOVE PORTIONS

(75) Inventor: Yoshitaka Iwai, Kobe (JP)

(73) Assignee: Sumitomo Rubber industries, Ltd., Kobe (JP)

( * ) Notice: Subject to any disclaimer, the term of this patent is extended or adjusted under 35 U.S.C. 154(b) by 733 days.

(21) Appl. No.: 12/677,479

(22) PCT Filed: Aug. 1, 2008

(86) PCT No.: PCT/JP2008/063898
§ 371 (c)(1),
(2), (4) Date: Mar. 10, 2010

(87) PCT Pub. No.: WO2009/034791
PCT Pub. Date: Mar. 19, 2009

(65) Prior Publication Data
US 2010/0326577 A1 Dec. 30, 2010

(30) Foreign Application Priority Data
Sep. 13, 2007 (JP) ................................. 2007-238195

(51) Int. Cl.
*B60C 11/03* (2006.01)
(52) U.S. Cl.
USPC ..................................... 152/209.8; 152/209.9
(58) Field of Classification Search
USPC .......................................... 152/209.8, 209.9
See application file for complete search history.

(56) References Cited

U.S. PATENT DOCUMENTS

| 6,340,040 B1 * | 1/2002 | Ikeda ........................ 152/209.18 |
| 6,439,286 B1 | 8/2002 | Baumhofer et al. |
| 6,796,350 B1 | 9/2004 | Gerresheim et al. |
| D505,380 S * | 5/2005 | Sugitani et al. ............... D12/524 |
| 2002/0139460 A1 * | 10/2002 | Boiocchi et al. ........... 152/209.8 |
| 2005/0076985 A1 | 4/2005 | Colombo et al. |
| 2006/0130950 A1 * | 6/2006 | Murata .................... 152/209.24 |
| 2008/0000564 A1 * | 1/2008 | Mukai ......................... 152/209.8 |
| 2008/0236714 A1 | 10/2008 | Kojima |

FOREIGN PATENT DOCUMENTS

| EP | 1676725 A1 | 7/2006 |
| JP | 4-145341 B | 5/1995 |

(Continued)

OTHER PUBLICATIONS

Machine translation for Japan 2006-143040 (no date).*

*Primary Examiner* — Steven D Maki
(74) *Attorney, Agent, or Firm* — Birch, Stewart, Kolasch & Birch, LLP

(57) ABSTRACT

Steering stability and drainage property are improved in good balance. A center land portion 5 is formed between crown circumferential grooves 3i, 3o which are located on inner side and outer side of a vehicle and extend in the circumferential direction on both sides of the tire equator. In the center land portion 5 are disposed a plurality of curved oblique grooves 8 each of which extends obliquely toward the inner side of the vehicle across the tire equator from its outer end 8a opening at the outer crown circumferential groove 3o, turns toward the outer side of the vehicle, and further extends obliquely up to its inner end 8b located in the center land portion 5, and the respective curved oblique grooves 8 are connected with each other through connecting groove portions 11 each extending in the circumferential direction from the inner end 8b. In the center land portion 5 is disposed a center rib 5a which is defined by the connecting groove portions 11, portions of the curved oblique grooves 8 each portion extending between the connecting groove portions 11, and the inner crown circumferential groove 3i, and which extends continuously in the circumferential direction while repeating increase and decrease of its axial width, and the ratio of maximum width to minimum width of the center rib 5a is 2.0 to 4.0.

8 Claims, 9 Drawing Sheets

FOREIGN PATENT DOCUMENTS

| | | |
|---|---|---|
| JP | 2000-238510 A | 9/2000 |
| JP | 2001-39122 A | 2/2001 |
| JP | 2003-503266 A | 1/2003 |
| JP | 2004-155416 A | 6/2004 |
| JP | 2004-523422 A | 8/2004 |
| JP | 2006-143040 A * | 6/2006 |
| JP | 2007-237795 A | 9/2007 |
| JP | 2008-6987 A | 1/2008 |
| WO | WO 2005/032855 A1 | 4/2005 |

* cited by examiner

PNEUMATIC TIRE WITH TREAD HAVING CENTER RIB, CURVED OBLIQUE GROOVES AND CONNECTING GROOVE PORTIONS

TECHNICAL FIELD

The present invention relates to a pneumatic tire having a steering stability and a drainage property which have been improved in good balance.

BACKGROUND ART

Pneumatic tires are required to have repugnant good properties, i.e., steering stability on dry asphalt roads and drainage property on wet roads. In order to simultaneously enhance these properties, a proposal is made in the following Patent Literature 1.
Patent Literature 1: JP-A-2004-155416

DISCLOSURE OF THE INVENTION

Problems To Be Solved By the Invention

The Patent Literature 1 discloses a pneumatic tire wherein a sipe-like narrow circumferential groove is provided on the tire equator in a center rib extending on the tire equator. However, such a tread pattern leaves room for improvement in drainage property. On the other hand, in order to enhance the drainage property at a tire equator location, it is conceived to provide a wide straight groove on the tire equator. However, there is a possibility that the wide straight groove would decrease the rigidity of a tread center portion to deteriorate the steering stability.

The present invention has been made in view of such circumstances, and it is an object of the present invention to provide a pneumatic tire capable of improving the steering stability and the drainage property in good balance. The basic concept of the present invention resides in that a plurality of curved oblique grooves are provided at intervals in the tire circumferential direction in a center land portion which is formed on the tire equator and between an inner crown circumferential groove located on an inner side of a vehicle when a tire is fitted to the vehicle and an outer crown circumferential groove located on an outer side of the vehicle, wherein each curved oblique groove extends obliquely from its outer end which opens to the outer crown circumferential groove, toward the inner side of the vehicle over the tire equator, turns toward the outer side of the vehicle at a closest approach point that the curved oblique groove makes the closest approach to the inner crown circumferential groove, and then extends obliquely up to its inner end located in the center land portion, and wherein the respective curved oblique grooves are connected with each other through connecting groove portions each extending in the tire circumferential direction from said inner end to an adjacent curved oblique groove adjoining in the tire circumferential direction.

Means To Solve the Problems

The present invention is characterized in that, in a pneumatic tire including a tread portion provided with a pair of crown circumferential grooves which extend continuously and straightly in the tire circumferential direction on both sides of the tire equator to provide a center land portion between them,
the crown circumferential grooves comprise an inner crown circumferential groove which is located on the inside of the tire equator with respect to a vehicle when a tire is fitted to the vehicle, and an outer crown circumferential groove which is located on the outside of the tire equator with the fitted tire,
a plurality of curved oblique grooves are provided in the center land portion at intervals in the tire circumferential direction, wherein each curved oblique groove extends obliquely from its outer end which opens at the outer crown circumferential groove, toward the inside of the vehicle over the tire equator, turns toward the outside of the vehicle at a closest approach location that the curved oblique groove makes the closest approach to the inner crown circumferential groove, and further extends obliquely up to its inner end located in the center land portion,
the respective curved oblique grooves are connected with each other through connecting groove portions each extending in the tire circumferential direction from said inner end to an adjacent curved oblique groove adjoining in the tire circumferential direction, and
the center land portion has a center rib which is defined by the connecting groove portions, portions of the curved oblique grooves each portion extending between the connecting groove portions, and the inner crown circumferential groove, and which extends continuously in the tire circumferential direction while repeating increase and decrease of its axial width, and in which the ratio of the maximum width to the minimum width of the center rib is from 2.0 to 4.0.

In the specification, the "dimensions" of respective parts of the tread portion denote values determined in an unloaded normal state, unless otherwise noted, wherein a tire is mounted on a normal rim and inflated to a normal inner pressure, but no load is applied thereto. The term "normal rim" denotes a rim defined for every tire in a standardizing system on which the tire is based and is, for example, the "standard rim" in JATMA, the "Design Rim" in TRA and the "Measuring Rim" in ETRTO. The term "normal inner pressure" denotes an air pressure defined for every tire in the standardizing system and is, for example, the "maximum air pressure" in JATMA, the maximum value recited in the table of "Tire Load Limits at Various Cold Inflation Pressures" in TRA, and the "Inflation Pressure" in ETRTO, provided that in case of tires for passenger cars, the "standard pressure" is 180 kPa.

Further, the groove width of respective grooves is defined by a width measured on the tread surface in a direction perpendicular to the center line of a groove. In case that the edge or edges of a groove are chamfered, the width denotes a value that the width of a chamfered portion is excluded.

Effects of the Invention

In the present invention, as stated above, a plurality of curved oblique grooves are provided at intervals in the tire circumferential direction in the center land portion extending on the tire equator. Since each of these curved oblique grooves extends from its inner end to its outer end across the tire equator so as to delineate a smooth arc-like curve, water can be smoothly discharged to the outer crown circumferential groove, thus exhibiting an excellent drainage performance in a wide range. Also, since curved oblique grooves adjacent to each other in the tire circumferential direction are connected with each other through connecting groove portions passing on the inner end side and since these connecting groove portions pass near the tire equator C, the drainage performance is further enhanced on the tire equator side.

Further, since the center rib formed in the center land portion continues in the circumferential direction, the circumferential rigidity of the center land portion can be enhanced and, therefore, the grip force is increased to enhance the stability during straight running. Furthermore, since the center rib has a width repeatedly increased and decreased, the minimum width of the center rib can be set to a smaller value while securing the lateral rigidity of the center rib. That is to say, since the curved oblique grooves establish a closer approach to the inner crown circumferential groove at the closest approach location, the drainage ability of the curved oblique grooves can be efficiently exhibited over a wide range.

| Explanation of Symbols | |
|---|---|
| 2 | Tread portion |
| 2S | Tread surface |
| 3i | Inner crown circumferential groove |
| 3o | Outer crown circumferential groove |
| 4i | Inner shoulder circumferential groove |
| 4o | Outer shoulder circumferential groove |
| 5 | Center land portion |
| 6i | Inner middle land portion |
| 6o | Outer middle land portion |
| 8 | Curved oblique groove |
| 11 | Connecting groove portion |
| 30 | Oblique sub-groove |
| 31 | Groove wall |
| 31U | Upper wall portion |
| 31L | Lower wall portion |
| 36 | Rib portion |
| C | Tire equator |
| e | Ridge line |
| K | Closest approach location |

BEST MODE FOR CARRYING OUT THE INVENTION

An embodiment of the present invention will be explained with reference to the accompanying drawings.

The pneumatic tire in this embodiment is suitable for use in summer as a tire for passenger cars. The pneumatic tire has an asymmetric tread pattern in a tread portion wherein an inner half pattern TPi with respect to the tire equator C which is located on an inner side of a vehicle when the tire is attached to the vehicle, and an outer half pattern TPo with respect to the tire equator C which is located on an outer side of the vehicle when the tire is attached to the vehicle, are asymmetrically formed (line asymmetry and point asymmetry). A mark such as "INSIDE" and/or "OUTSIDE" to indicate the direction of attaching the tire to a vehicle is put on a sidewall or the like of the pneumatic tire of this embodiment.

Figure 1:
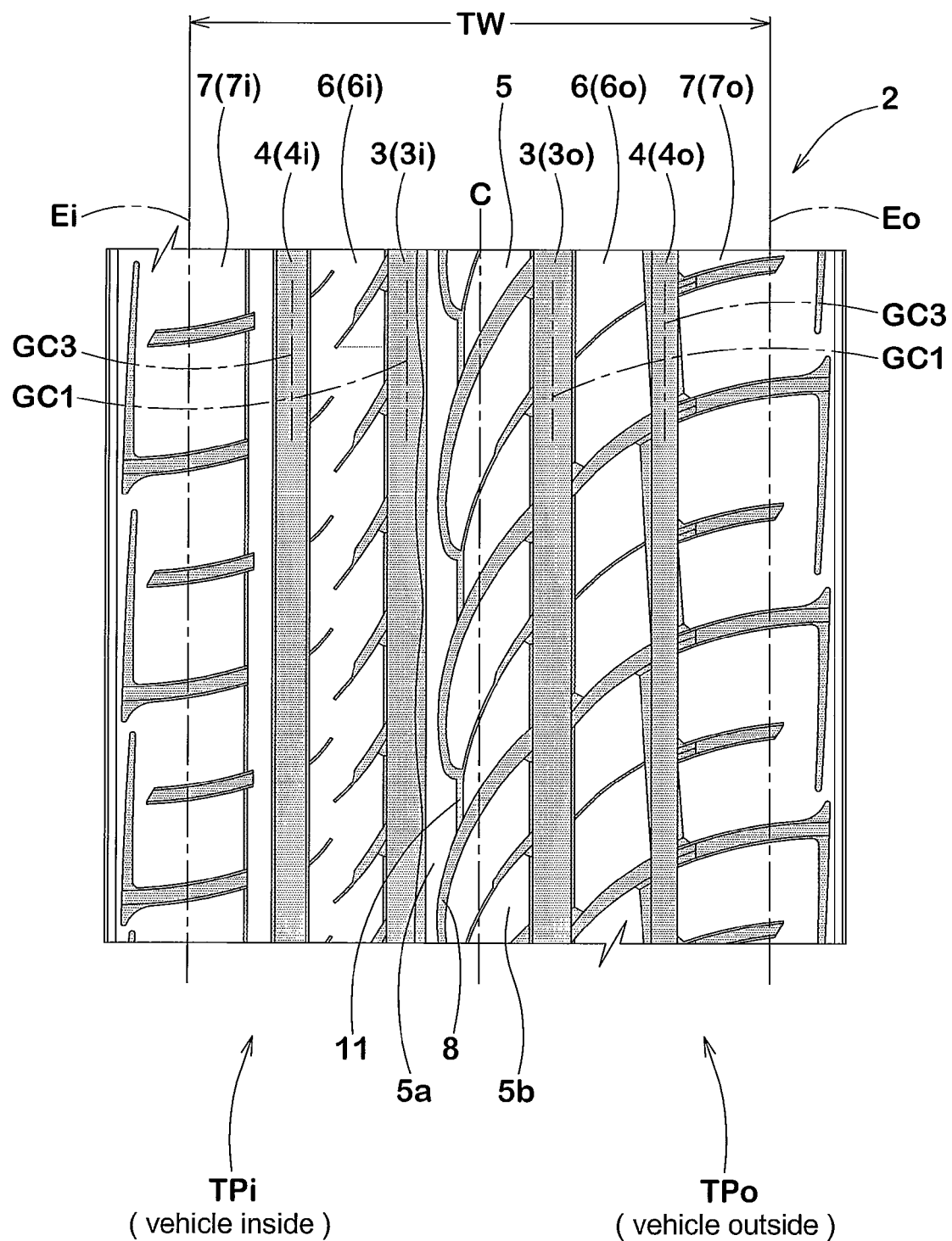
FIG. 1 is a development view showing a tread portion of a pneumatic tire according to an embodiment of the present invention.
Figure 2:
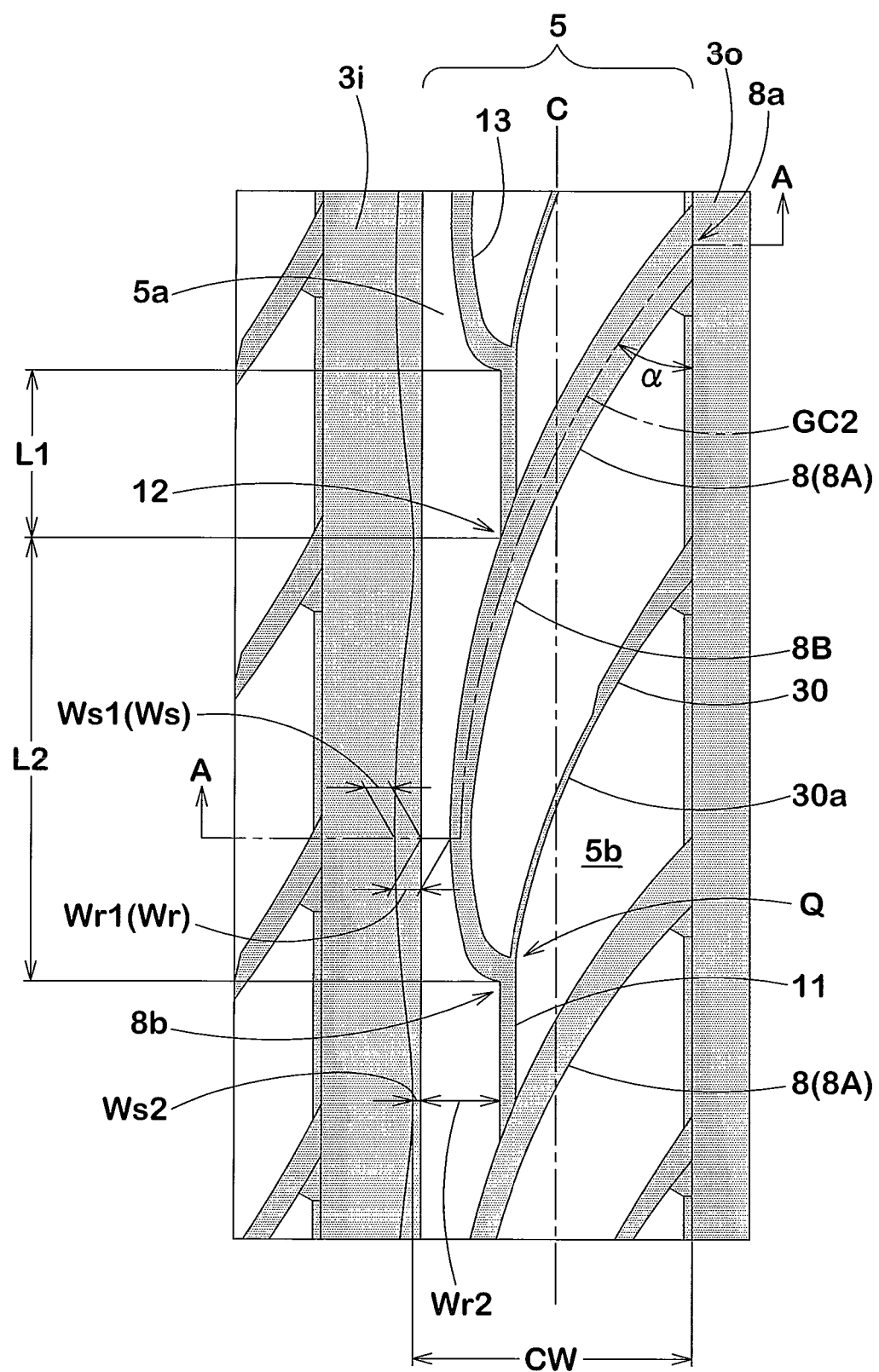
FIG. 2 is a partially enlarged view showing a center land portion.

FIG. 1 is a development of a tread portion 2 of a pneumatic tire according to an embodiment of the present invention, and FIG. 2 is a partially enlarged view showing a main part of FIG. 1. As shown in FIG. 1, the tread portion 2 is provided with a pair of crown circumferential grooves 3 which extend straight and continuously in the tire circumferential direction on both sides of the tire equator C, and a pair of shoulder circumferential grooves 4 which are disposed axially outside of the crown circumferential grooves 3 and extend continuously in the tire circumferential direction, whereby on the tread portion 2 are formed a center land portion 5 which extends between the crown circumferential grooves 3, 3, a pair of middle land portions 6 which extend between the crown circumferential groove 3 and the shoulder circumferential groove 4, and a pair of shoulder land portions 7 which extend between the shoulder circumferential groove 4 and a tread ground contact edge Ei or Eo.

The crown circumferential grooves 3 straightly extend on both sides of and in the vicinity of the tire equator C at which the ground contact pressure is high, thereby enhancing the water drainage property on the tire equator side. In view of this drainage property, it is preferable that the crown circumferential grooves 3 have a groove width GW1 of 5.0% or more, especially 5.5% or more, of a tread width TW, and a groove depth of 7.0 mm or more, especially 7.5 mm or more. However, if the groove width GW1 or groove depth of the crown circumferential grooves 3 is too large, the pattern rigidity in the vicinity of the tire equator C tends to be remarkably decreased to deteriorate the steering stability. Therefore, it is preferable that the groove width GW1 of the crown circumferential grooves 3 is 7.0% or less, especially 6.5% or less, of the tread width TW, and the groove depth of the crown circumferential grooves 3 is 9.0 mm or less, especially 8.5 mm or less.

The term "tread width TW" as used herein means an axial distance between inner tread ground contact edge Ei which is located on an inner side of a vehicle when a tire is fitted to the vehicle, and outer tread ground contact edge Eo which is located on an outer side of the vehicle with the fitted tire. The tread ground contact edges Ei and Eo denote ground contact edges of a tire at the time when the tire is in the standard state mentioned above and the tread portion 2 of such a tire is then brought into contact with a flat surface at a camber angle of 0° by applying a load of 88% of a standard load. By the way, the term "standard load" as used herein means a load defined for every tire in the standardizing system and, for example, denotes the "maximum load capacity" in JATMA, the maximum value recited in the table of "Tire Load Limits at Various Cold Inflation Pressures" in TRA, and the "load capacity" in ETRTO.

The crown circumferential grooves 3 comprise an inner crown circumferential groove 3i disposed in the inner half tread pattern TPi, and an outer crown circumferential groove 3o disposed in the outer half tread pattern TPo. These inner and outer crown grooves 3i and 3o may be disposed, for example, at locations which are line-symmetric with respect to the tire equator C, or at locations which are line-asymmetric with respect to the tire equator C. In each case, however, it is preferable for preventing the rigidity of the center land portion 5 from lowering that the axial distance between a groove center line GC1 of the crown circumferential groove 3 and the tire equator C is 9% or more, especially 10% or more, of the tread width TW and is, as to its upper limit, 15% or less, especially 14% or less, of the tread width TW. More preferably, the locations of the inner and outer crown circumferential grooves 3i and 3o are determined so that the axial width CW (shown in FIG. 2) of the center land portion 5 is from 15 to 19% of the tread width TW.

A plurality of curved oblique grooves 8 are provided in the center land portion 5 at intervals in the tire circumferential direction. As shown in FIG. 2, each of the curved oblique grooves 8 is formed into such a smooth arc-like curved line that its groove center line GC2 is convex toward the inside of a vehicle. Specifically, the curved oblique groove 8 extends obliquely in the center land portion 5 from an outer end 8a which opens into the outer crown circumferential groove 3o, toward the inner side of a vehicle across the tire equator, turns toward the outer side of the vehicle at a closest approach location K at which the curved oblique groove makes the closest approach to the inner crown circumferential groove 3i, and further extends obliquely up to an inner end 8b located in the center land portion 5 to terminate there. In this embodiment, the inner end 8b is located inside of the tire equator C with respect to the vehicle.

The curved oblique grooves 8, 8 adjacent in the tire circumferential direction are connected with each other through a connecting groove portion 11 which extends straight in the tire circumferential direction from an inner end 8b of one curved oblique groove 8 to the other curved oblique groove 8. Thus, the curved oblique groove 8 is sectioned into a first oblique groove portion 8A which extends from its outer end 8a to an intersecting portion 12 with the connecting groove portion 11, and a second oblique groove portion 8B which extends from the intersecting portion 12 to the inner end 8b. The second oblique groove portions 8B and the connecting groove portions 11 virtually form a composite circumferential groove 13 extending continuously in the tire circumferential direction.

As a result of disposing the curved oblique grooves 8 and the connecting groove portions 11 in the center land portion 5, the center land portion 5 includes a center rib 5a which is formed between the composite circumferential groove 13 and the inner crown circumferential groove 3i and which extends continuously in the circumferential direction while repeating increase and decrease in its axial width Wr. Further, between the composite circumferential groove 13 and the outer crown circumferential groove 3o is formed a row of center blocks 5b sectioned in the circumferential direction by the first oblique groove portions 8A.

Like this, since in the center land portion 5 each curved oblique groove 8 extends from its inner end 8b to its outer end 8a across the tire equator C to delineate a smooth arc-like curve, water can be smoothly discharged into the outer crown circumferential groove 3o and accordingly an excellent drainage property is exhibited over a wide range. Furthermore, since the curved oblique grooves 8, 8 adjacent in the circumferential direction are connected with connecting groove portions 11 to form a composite circumferential groove 13 and since the connecting groove portions 11 which constitute the composite groove 13 pass in the vicinity of the tire equator C, the drainage property is enhanced on the tire equator side. Further, since the composite circumferential groove 13 includes the arc-like oblique groove portions 8B, an excellent drainage property can be exhibited with suppressing a columnar resonance which is apt to generate in a straight groove.

From the viewpoint of the drainage property, it is preferable that the angle α of the curved oblique groove 8 at its outer end 8a with respect to the circumferential direction is 45° or less, especially 40° or less, more especially 35° or less. However, if the angle α is too small, the rigidity of a corner portion between the curved oblique groove 8 and the inner crown circumferential groove 3i tends to decrease to cause uneven wear. Therefore, it is preferable that the angle α is 20° or more, especially 25° or more.

Since the center rib 5a formed in the center land portion 5 extends continuously in the circumferential direction, the circumferential rigidity of the center land portion 5 can be enhanced and, therefore, it serves to increase the grip force to improve the stability in straight running. Further, since the center rib 5a extends continuously in the circumferential direction, the amount of deformation in the lateral direction is suppressed even in cornering, so a large lateral force can be generated. Further, since the center rib 5a extends with repeating increase and decrease in its axial width Wr, the minimum width Wr1 can be decreased with securing the lateral rigidity of the center rib 5a. That is to say, since it is possible to bring the curved oblique grooves 8 closer to the inner crown circumferential groove 3i at the closest approach locations K, the drainage property in the center land portion 5 brought by the curved oblique grooves 8 can be efficiently exhibited over a wider range. For this purpose, the ratio Wr2/Wr1 of the maximum width Wr2 to the minimum width Wr1 of the center rib 5a is set to a range of 2.0 to 4.0. If the ratio Wr2/Wr1 is less than 2.0, the center rib 5a is short of lateral rigidity, so the minimum width Wr1 cannot be made small sufficiently. If the ratio Wr2/Wr1 is more than 4.0, the lateral rigidity of the center rib 5a becomes nonuniform to cause uneven wear. Therefore, preferably the ratio Wr2/Wr1 is at least 2.2 and is at most 3.8. Further, that the curved oblique groove 8 has a configuration such that the second oblique groove portion 8B thereof including the closest approach location K is in the form of an arc-like curved line also makes a great contribution to ensuring the lateral rigidity of the center rib 5a.

From the viewpoint of securing the rigidity of the center rib 5a, it is preferable that the ratio L1/L2 of the circumferential length L1 of the connecting groove portion 11 to the circumferential length L2 of a portion of the curved oblique groove 8 located between the connecting groove portions 11, 11 (i.e., the second oblique groove portion 8B) is set within the range of 0.3 to 0.5. If the ratio L1/L2 is outside this range, an adequate rigidity is hard to be secured for a reason or the like that the balance of rigidity is impaired, so the steering stability, especially the steering stability in high speed running, tends to deteriorate.

Figure 3:
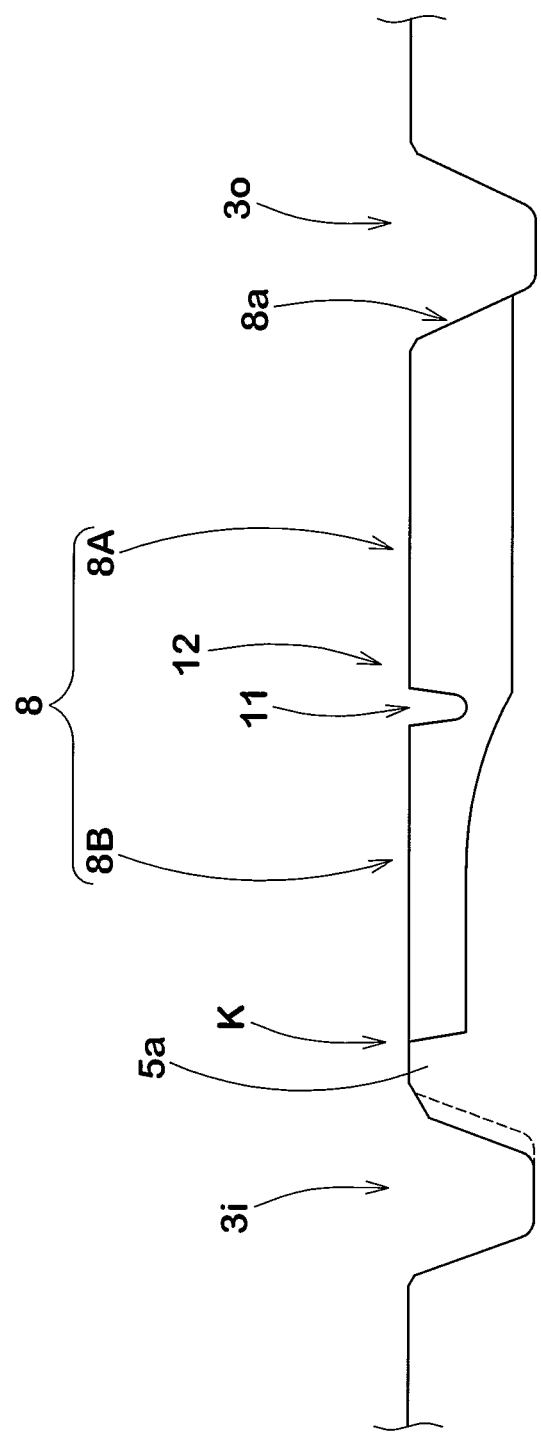
FIG. 3 is a cross sectional view taken on line A-A in FIG. 2.

From the viewpoint of the drainage property, it is preferable that the curved oblique groove 8 has a width gradually increasing from the closest approach location K toward the outer end 8a. Further, as shown exaggeratingly in FIG. 3 which is a cross section view along line A-A in FIG. 2, it is preferable that the depth of the curved oblique groove 8 is increased continuously or stepwise from the closest approach location K toward the outer end 8a. The depth of the curved oblique groove 8 is not more than the depth of the crown circumferential grooves 3. Also, the groove depth of the connecting groove portion 11 is not more than the depth at the intersecting portion 12 of the curved oblique groove 8. Further, the width of the curved oblique groove 8 is smaller than the width of the crown circumferential grooves 3. The number of the curved oblique grooves 8 to be formed (the number of pitches) is preferably from 29 to 32 per a round of a tire. If it is less than 29, there is a possibility that the drainage property at the center land portion 5 is not sufficiently enhanced, and if it is too many, there is a possibility that the center land portion 5 is short of the ground contact area or the rigidity, so the steering stability is not sufficiently enhanced.

In the center blocks 5b, the rigidity rapidly changes at a corner portion Q, as shown in FIG. 2, located at the inner end 8b of the curved oblique groove 8. Therefore, a collision noise tends to generate when the corner portion Q collides with a road and, also, uneven wear tends to occur. Therefore, in this embodiment, oblique sub-grooves 30 each extending obliquely from the inner end 8b toward the outer side of a vehicle passing between the adjacent curved oblique grooves 8, 8 are formed in the center blocks 5b to ease the rigidity at the corner portions Q, thereby suppressing the collision noise and uneven wear. The oblique sub-groove 30 in this embodiment extends approximately parallel to the curved oblique groove 8 from the inner end 8b up to the outer crown circumferential groove 3o, and it also contributes to further improvement of the drainage property. In this case, in order to secure the steering stability in high speed running, a portion of the oblique sub-groove 30 between the inner end 8b and a location across the tire equator C is formed into a sipe-like narrow groove 30a having a width of 1.5 mm or less to thereby maintain the rigidity on the tire equator C.

Figure 4:
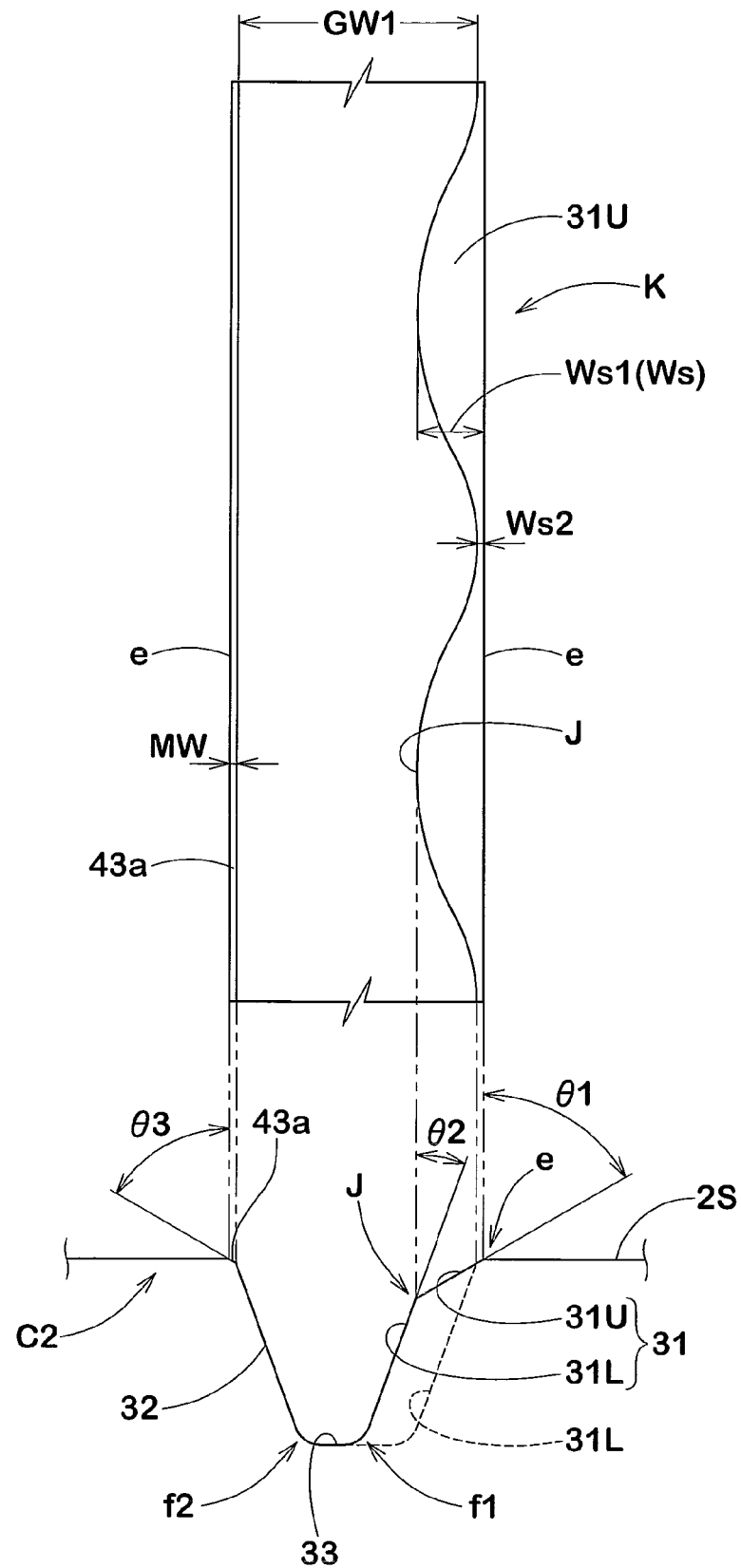
FIG. 4 is plan and cross section views showing an inner crown circumferential groove.

As shown exaggeratingly in FIG. 4, the inner crown circumferential groove 3i is formed as a straight groove in which respective ridge lines "e" at which both groove walls 31 and 32 intersect with the tread surface 2S, extend straight in the circumferential direction, thereby suppressing uneven wear which may occur when the ridge line "e" is in a zigzag shape. At least the groove wall 31 on the tier equator side is formed to include a mildly-inclined upper wall portion 31U which extends downward from the ridge line "e" at an angle θ1 of 50 to 70° with respect to the normal line to the tread surface 2S, and a steeply-inclined lower wall portion 31L which is continuous with the lower edge of the upper wall portion 31U and extends up to a groove bottom 33 at an angle θ2 smaller than the angle θ1 (e.g., 10 to 20°). Furthermore, the upper wall portion 31U extends in the circumferential direction with repeating increase and decrease of an axial wall width Ws. As shown in FIG. 2, the upper wall portion 31U has a maximum wall width Ws at a location K at which the width of the center rib 5a becomes minimum, namely at the closest approach location K.

Specifically, in the inner crown circumferential groove 3i, an edge f1 on the tire equator side of the groove bottom 33 extends in the circumferential direction with meandering in the form of a wave, and the lower wall portion 31L rises from the edge f1 at the angle θ2 mentioned above. This angle θ2 is constant over the entire of the tire. Therefore, the lower wall portion 31L is formed as a corrugated plate-like curved surface synchronous with the edge f1. In contrast, the upper wall portion 31U is formed as an inclined flat surface which is inclined from the ridge line "e" at the angle θ1. Therefore, an intersecting portion J between the upper wall portion 31U and the lower wall portion 31L is in a wave form synchronous with the edge f1, and the wall width Ws of the upper wall portion 31U repeats increase and decrease in the circumferential direction.

Like this, the axial wall width Ws in the inner crown circumferential groove 3i is maximum at a location K at which the center rib 5a has a minimum width (i.e., closest approach location K mentioned above), so a lower rigidity portion of the center rib 5a can be effectively reinforced. Thus, the rigidity of the center rib 5a can be enhanced with rendering it uniform. Thus, it is possible to further enhance the steering stability in high speed running. The ratio Ws1/Ws2 of the maximum value Ws1 to the minimum value Ws2 of the wall width Ws is preferably from 2.0 to 4.0. If the ratio Ws1/Ws2 is less than 2.0, the reinforcing effect is poor, so the rigidity of the center rib 5a cannot be sufficiently enhanced. On the other hand, if the ratio is more than 4.0, the degree of meandering is large, so the drainage property in the inner crown circumferential groove 3i tends to decrease. From such points of view, it is preferable that the ratio Ws1/Ws2 is at least 2.5 and is at most 3.5. It is also preferable that the maximum value Ws1 of the wall width Ws is from 6 to 10% of the width CW of the center land portion 5. Further, since the inner crown circumferential groove 3i has a waved bottom edge f1, it is hard to undergo bending deformation at the groove bottom 33, it can also contribute to securing the rigidity of the tread portion 2. The number of pitches in increase and decrease of the wall width Ws is identical with the number of pitches in increase and decrease of the width Wr of the center rib 5a.

In the inner crown circumferential groove 3i, the edge f2 on the vehicle inner side of the groove bottom 33 is preferably extends straight in the circumferential direction. The reason is that if both edges f1 and f2 are formed into a wave form, the drainage property of the inner crown circumferential groove 3i is markedly decreased. Thus, the bottom edge f2 on the vehicle inner side is formed into a straight line.

The shoulder circumferential groove 4 includes an outer shoulder circumferential groove 4o which extends between the outer crown circumferential groove 3o and an outer ground contact edge Eo of the tread, and an inner shoulder circumferential groove 4i which extends between the inner crown circumferential groove 3i and an inner ground contact edge Ei of the tread.

The inner and outer shoulder circumferential grooves 4i and 4o extends continuously in the tire circumferential direction in a straight line manner. An inner middle land portion 6i is formed between the inner shoulder circumferential groove 4i and the inner crown circumferential groove 3i, and an outer middle land portion 6o is formed between the outer shoulder circumferential groove 4o and the outer crown circumferential groove 3o.

Figure 7A:
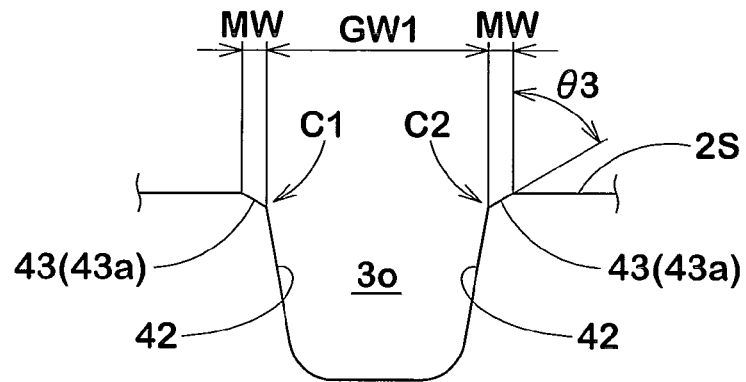
FIGS. 7(A) to 7(C) are cross section views of an outer crown circumferential groove, and inner and outer shoulder circumferential grooves.
Figure 7B:
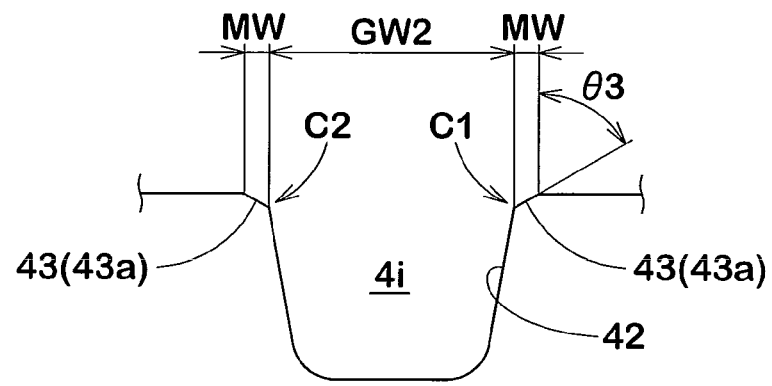
Figure 7C:
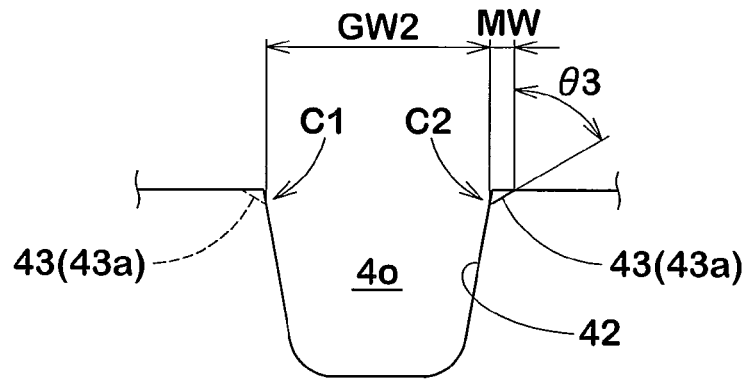

The width GW2 (shown in FIGS. 7(B) and 7(C)) and depth of the shoulder circumferential grooves 4 are not particularly limited. However, since a larger load acts on the shoulder circumferential grooves 4 during cornering as compared with the crown circumferential grooves 3, it is preferable that the groove width GW2 of the shoulder circumferential grooves 4 is from 4 to 6% of the tread width TW. It is particularly preferable that the groove width GW2 is smaller than the groove width of the crown circumferential grooves 3. As to the groove depth of the shoulder circumferential grooves 4, the depth preferred for the crown circumferential grooves 3 is applicable. The inner shoulder circumferential groove 4i and the outer shoulder circumferential groove 4o may be disposed, for example, at locations which are line-symmetric with respect to the tire equator C, or at locations which are line-asymmetric with respect to the tire equator C. In both cases, in order to prevent the rigidity of the middle land portions 6 from lowering and, further, in order to optimize the rigidity balance thereof with other land portions 5 and 7, it is preferable that the axial distance between a groove center line GC3 of each of the shoulder circumferential grooves 4 and the tire equator C is 27% or more of the tread width TW and is, as to the upper limit, 33% or less of the tread width TW.

Figure 6:
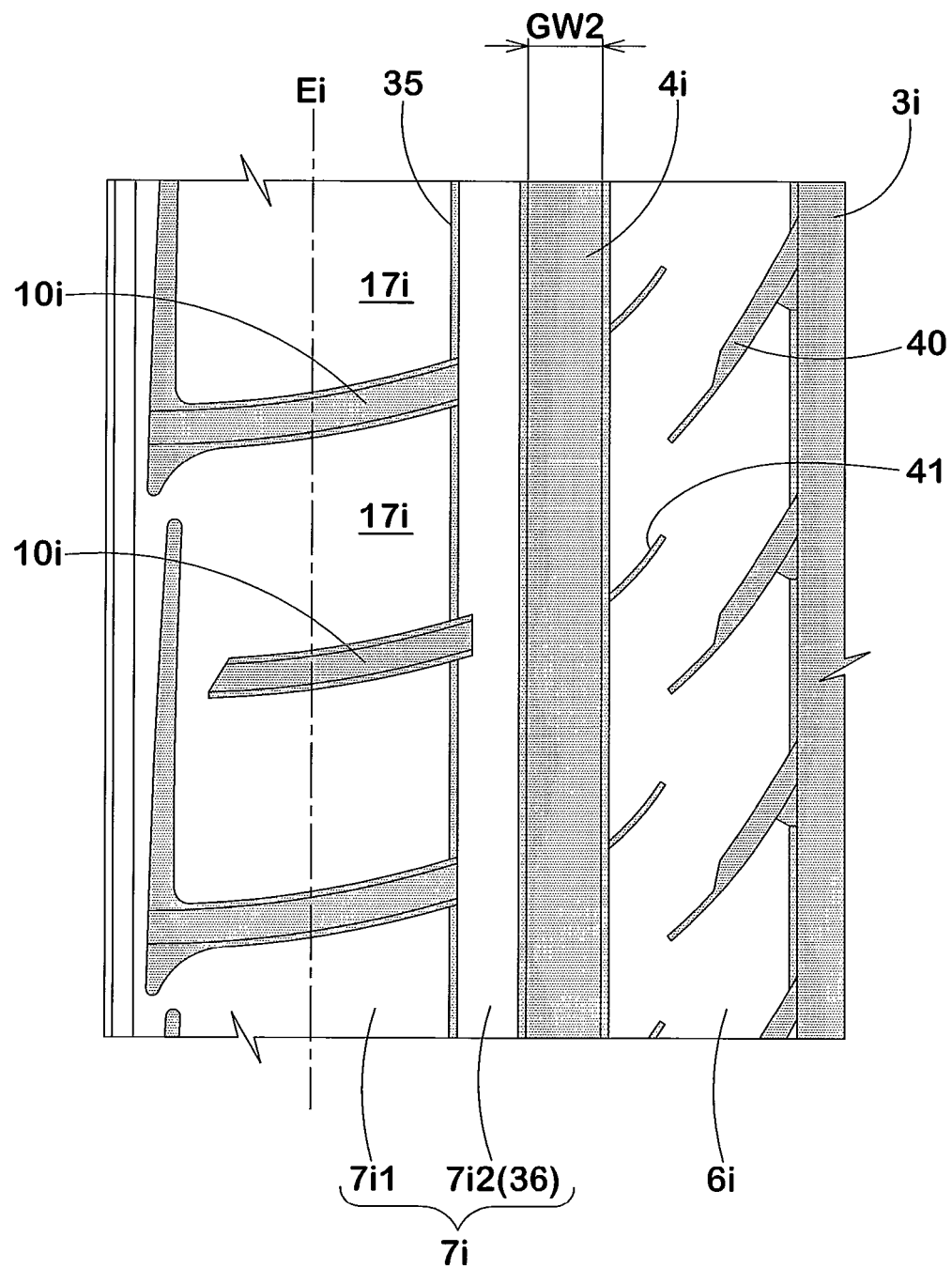
FIG. 6 is an enlarged view of an inner middle land portion and an inner shoulder land portion.

The inner middle land portion 6i is formed as a circumferentially continuous rib without forming any lateral groove and sipe which cross it, as shown in FIG. 6. The participation of the inner middle land portion 6i in drainage property during cornering is relatively low as compared with the outer middle land portion 6o for a reason or the like that the ground contact surface shifts toward a vehicle outer side at the time of cornering by an influence of lateral gravity acceleration. Therefore, by forming the inner middle land portion 6i as a rib having a large circumferential rigidity, the straight running stability, eventually the steering stability, can be enhanced while securing the hydroplaning performance in cornering. In case of enhancing the drainage property by widening the inner shoulder circumferential groove 4i, too, the noise performance can be prevented from deteriorating, since there is no lateral groove and no sipe crossing the inner middle land portion 6i and therefore a columnar resonance is hard to occur in the inner shoulder circumferential groove 4i. The inner middle land portion 6i may be provided with lateral grooves 40 or sipes 41 which terminate inside the middle land portion 6i.

Figure 5:
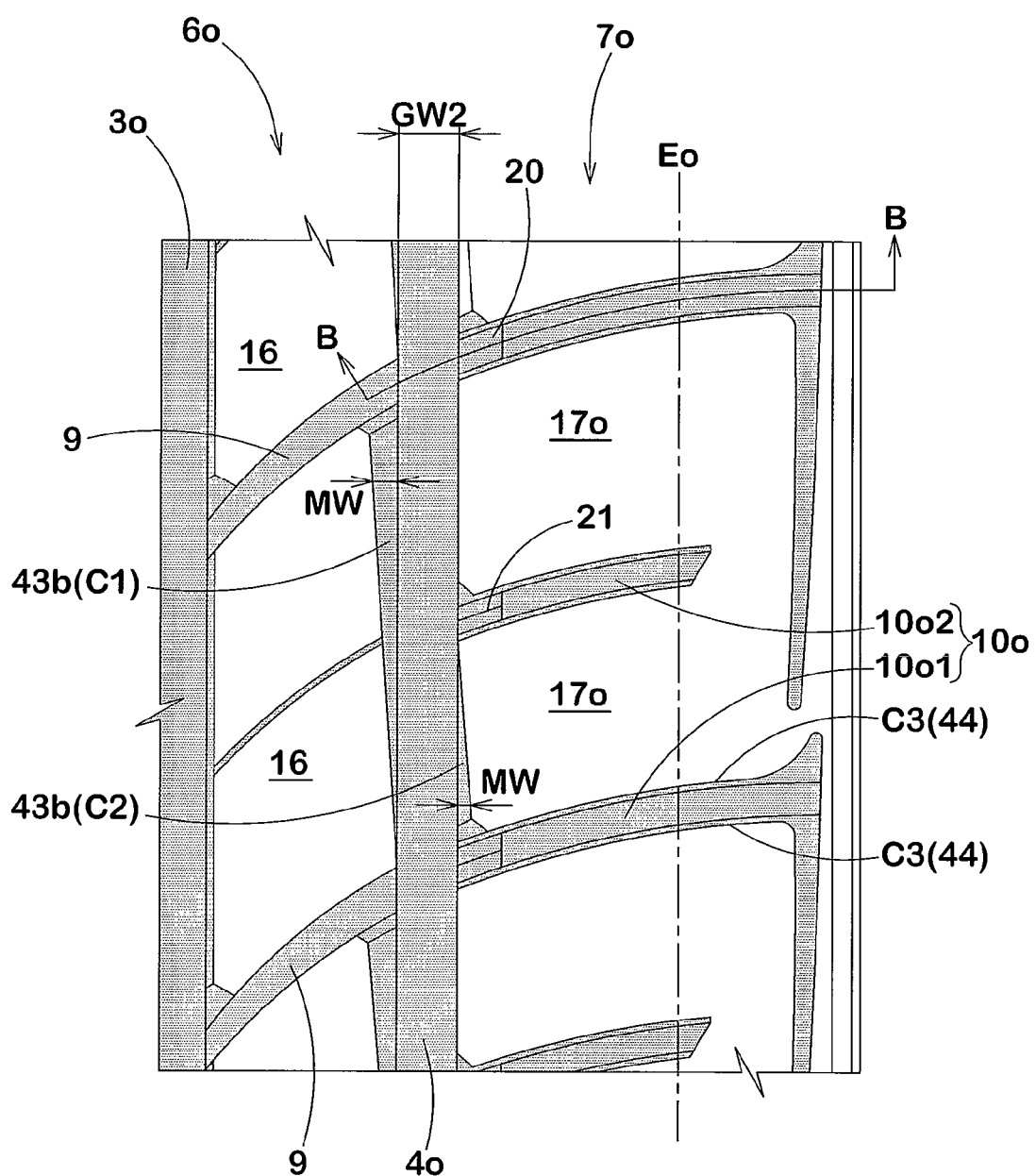
FIG. 5 is an enlarged view of an outer middle land portion and an outer shoulder land portion.

On the other hand, as shown in FIG. 5, the outer middle land portion 6o is provided at intervals with a plurality of middle lateral grooves 9 which cross the land portion 6o, whereby the outer middle land portion 6o is divided into a plurality of middle blocks 16. The middle lateral grooves 9 are formed at intervals in the same number of pitches as the curved oblique grooves 8. In this embodiment, each middle lateral groove 9 extends along an extended line of the curved oblique groove 8, so it is smoothly connected to the curved oblique groove 8 through the outer crown circumferential groove 3o. Therefore, such lateral grooves 9 serve to smoothly discharge toward the vehicle outer side a part of water which have flowed from the curved oblique groove 8 into the outer crown circumferential groove 3o, thereby enhancing the hydroplaning performance, especially hydroplaning performance in cornering. The middle lateral grooves 9 have a width gradually decreasing toward the tire equator C side at which the ground contact pressure is higher, whereby the rigidity of the middle blocks 16 is optimized to prevent uneven wear or to enhance the steering stability.

An outer shoulder land portion 7o located between the outer shoulder circumferential groove 4o and the outer ground contact edge Eo of the tread is provided with a plurality of shoulder lateral grooves 10o which cross this land portion 7o and are disposed at intervals in the circumferential direction, whereby the outer shoulder land portion 7o is divided into a plurality of shoulder blocks 17o. The shoulder lateral grooves 10o comprise first lateral grooves 10o1 each extending along an extended line of the curved oblique groove 8 and middle lateral groove 9, and second lateral grooves 10o2 each of which is disposed between the first lateral grooves 10o1, 10o1 and is parallel to the first lateral grooves 10o1. Like this, since the first lateral grooves 10o1 are smoothly connected to the middle lateral grooves 9 through the outer shoulder circumferential groove 4o, a part of water which have flowed from the middle lateral grooves 9 into the outer shoulder circumferential groove 4o can be smoothly discharged toward the vehicle outer side to enhance the hydroplaning performance, especially hydroplaning performance in cornering. The shoulder lateral grooves 10o are inclined at an angle of 25° or less, preferably 15° or less, with respect to the tire axial direction, thereby enhancing the lateral rigidity of the shoulder blocks 17o to improve the cornering performance.

An inner shoulder land portion 7i located between the inner shoulder circumferential groove 4i and the inner ground contact edge Ei of the tread is divided into inner and outer land portions 7i1 and 7i2, as shown in FIG. 6, by a sipe-like narrow circumferential groove 35 extending in the circumferential direction and having a groove width of 1.0 mm or less. The inner land portion 7i1 is provided with a plurality of shoulder lateral grooves 10i extending from the inner tread ground contact edge Ei, whereby the inner land portion 7i1 is divided into a plurality of shoulder blocks 17i. The shoulder lateral grooves 10i are substantially identical to grooves that the shoulder lateral grooves 10o have been symmetrically moved with respect to an arbitrary point on the tire equator C. The outer land portion 7i2 is formed as a circumferentially continuous rib portion 36 without being crossed by any lateral groove and any sipe. Like this, since the outer land portion 7i2 adjacent to the inner shoulder circumferential groove 4i is formed as a circumferentially continuous rib portion 36, columnar resonance is hard to occur in the inner shoulder circumferential groove 4i and accordingly deterioration of the noise performance can be suppressed. Further, rigidity balance on both sides of the inner shoulder circumferential groove 4i can be optimized.

In FIGS. 7(A) to 7(C) are shown cross section views of outer crown circumferential groove 3o, and inner and outer shoulder circumferential grooves 4i and 4o. Each of the circumferential grooves 3o, 4i and 4o has a corner portion C1 on the tire equator side and a corner portion C2 on the ground contact edge side, at which both groove walls 42 intersect with the tread surface 2S. In this embodiment, each of the corner portions C1 and C2 are cut off by a slant face to provide a chamfered 1.0 portion 43. The chamfered portion 43 is inclined at an angle θ3 of 50 to 70° with respect to the normal line to the tread surface 2S. Since a poor rigidity portion at the corner portions C1 and C2 are removed, rubber chipping and uneven wear which may occur at the corner portions C1 and C2 when a lateral force or the like acts thereon, are effectively prevented.

In this embodiment, the chamfered portions 43a of the outer crown circumferential groove 3o and the inner shoulder circumferential groove 4i have a constant axial chamfer width MW. If the chamfer width MW is too small, there is a possibility that the effect of suppressing uneven wear is not sufficiently exhibited, and if it is too large, there is a possibility that the steering stability is deteriorated because the ground contact area of the middle land portion 6 is reduced. From such points of view, it is preferable that the chamfer width MW is 0.5 mm or more, especially 1.0 mm or more, and is, as to the upper limit, 2.5 mm or less, especially 2.0 mm or less.

On the other hand, the chamfer width MW of the chamfered portions 43b of the outer shoulder circumferential groove 4o changes in the tire circumferential direction. Specifically, as to the corner portion C1 on the tire equator side, the chamfered portion 43b has a maximum chamfer width MW at intersecting locations at which the groove 4o intersects with the middle lateral grooves 9, and extends circumferentially with gradually decreasing its chamfer width MW toward one circumferential direction. On the other hand, as to the corner portion C2 on the ground contact edge side, the chamfered portion 43b has a maximum chamfer width MW at intersecting locations at which the groove 4o intersects with the shoulder lateral grooves 10o, and extends circumferentially with gradually decreasing its chamfer width MW toward the opposite circumferential direction. Each chamfered portion 43b is intermittently formed in the circumferential direction. The maximum chamfer width MW of the chamfered portion 43b is from 1.0 to 4.0 mm, and is larger than the chamfer width MW of the chamfered portions 43a of the outer crown circumferential groove 3o and the inner shoulder circumferential groove 4i. The reason is that a larger load or lateral force acts on a vehicle outer side during cornering and, therefore, rubber chipping and uneven wear are easy to occur. Thus, the maximum value of chamfer width MW is kept large to suppress the rubber chipping and uneven wear.

As shown in FIG. 4, a corner portion C2 on the ground contact edge side of the inner crown circumferential groove 3i is also chamfered, in the same manner as the outer crown circumferential groove 3o and the inner shoulder circumferential groove 4i, to provide a chamfered portion 43a having a chamfer width MW constant in the circumferential direction. Further, in this embodiment, chamfered portions 44 having a narrower width than the chamfered portions 43a, e.g. those having a chamfer width of about 0.6 mm, are formed at corner portions C3 of the shoulder lateral grooves 10i and 10o.

Figure 8:
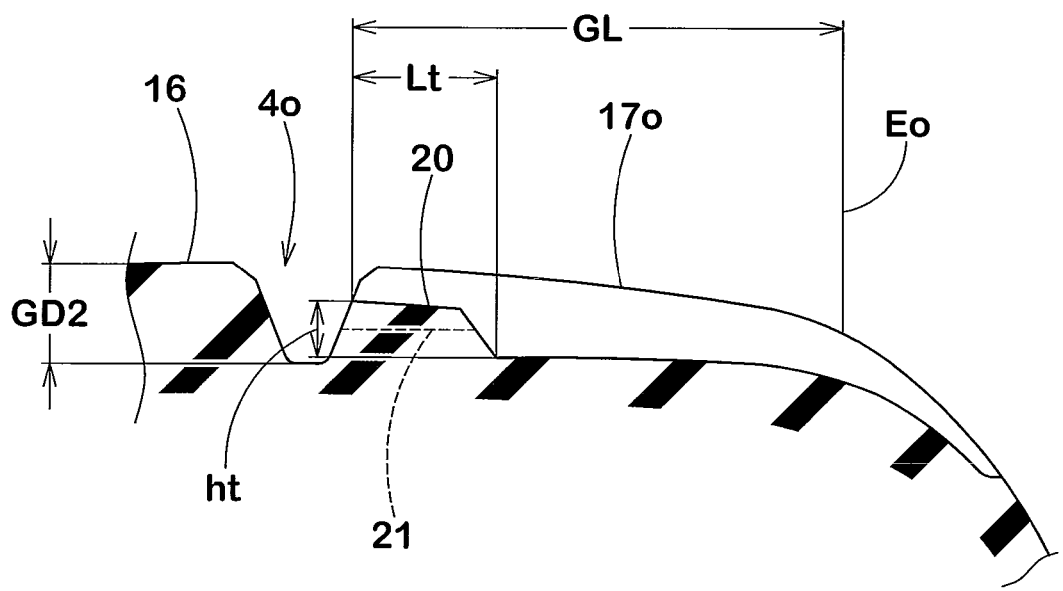
FIG. 8 is a cross section view taken on line B-B in FIG. 1.

FIG. 8 shows a cross section view taken on line B-B in FIG. 5. In this embodiment, each of the shoulder lateral grooves 10o is provided with a tie-bar 20 that the groove bottom rises, on the outer shoulder circumferential groove 4o side. The tie-bar 20 connects root portions of circumferentially adjacent shoulder blocks 17o, 17o, whereby the rigidity is increased to improve the steering stability and the braking performance. The tie-bar 20 also serves to prevent the shoulder block 17o from falling down in the circumferential direction, thereby effectively suppressing uneven wear such as a so-called heel/toe wear of the shoulder block 17o in cooperation with the chamfered portions 44. Further, since the tie-bar 20 will come into contact with a road surface as the tread portion 2 is worn away, enhancement of grip performance after middle stage of wear can be expected thereby.

Preferably, the tie-bar 20 is provided with a sipe 21 extending along the shoulder lateral groove 10o, whereby a portion between circumferentially adjacent shoulder blocks 17o, 17o can be widen through the sipe 21. The sipe 21 is useful, for example, in getting a sufficient traction when running on an unpaved road such as mud road or sand road.

The tie-bars 20 cannot sufficiently exhibit these effects if its height ht or its length Lt along the groove is too small, and the drainage property at the shoulder lateral grooves 10o may be deteriorated if the height ht or the length Lt is too large. From such points of view, it is preferable that the height ht of the tie-bars 20 is 50% or more, especially 60% or more, of the groove depth GD2 of the outer shoulder circumferential groove 4o, and is 80% or less, especially 70% or less, of the groove depth GD2. Also, it is preferable that the length Lt of the tie-bars 20 is 10% or more, especially 15% or more, of the groove length GL of the shoulder lateral grooves 10o, and is 30% or less, especially 25% or less, of the groove length GL.

An embodiment of the present invention has been described above, but it goes without saying that the present invention is not limited to only such a concrete embodiment shown in the drawings and can be practiced with various changes and modifications.

EXAMPLES

Pneumatic radial tires for passenger cars having a tire size of 225/45ZR17 and having a tread pattern shown in FIG. 1 were manufactured based on specifications shown in Table 1. The steering stability and drainage performance of the tires were tested. The results are shown in Table 1.
Tread width: 185 mm
Groove width of crown circumferential grooves: 12.9 mm
Groove depth of crown circumferential grooves: 8.2 mm
Groove width of shoulder circumferential grooves: 10.2 mm
Groove depth of shoulder circumferential grooves: 8.2 mm
Maximum groove width of curved oblique grooves: 5.7 mm
Maximum depth of curved oblique grooves: 7.2 mm
Maximum groove width of middle lateral grooves: 4.6 mm
Maximum depth of middle lateral grooves: 7.2 mm
Groove width of shoulder lateral grooves: 5.0 mm
Maximum depth of shoulder lateral grooves: 6.5 mm
Angle α at the outer end of curved oblique groove: 30°

Figure 9A:
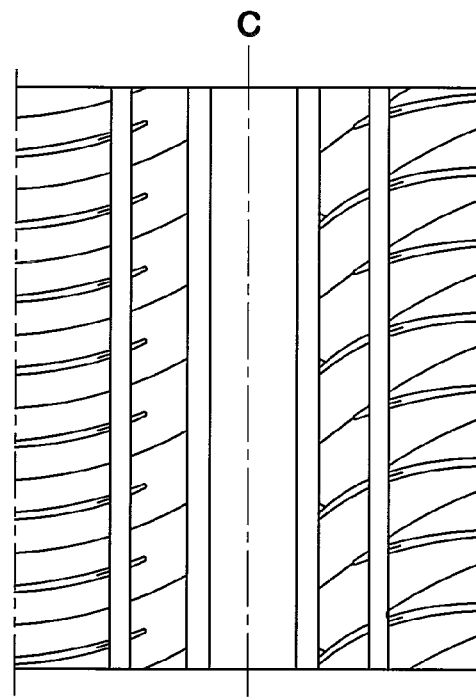
FIGS. 9(A) and 9(B) are plan views showing tread patterns used in Comparative Examples described after.
Figure 9B:
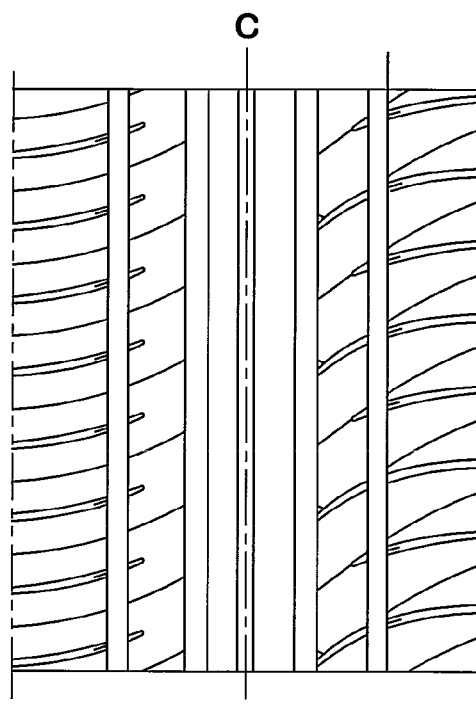

The same test as above was also made with respect to a tire having no groove in the center land portion as shown in FIG. 9(A) (Comparative Example 1) and a tire having a single straight groove in the center rib as shown in FIG. 9(B). The groove width was adjusted so that the land ratio became identical.

<Steering Stability>

The tires were attached to four wheels of a Japanese 2,500 cc FR passenger car (rim: 7.5 JJ, inner pressure: 200 kPa). The tires were inflated to an inner pressure of 200 kPa, and the car was run on a dry asphalt road of a test course under the condition of a single ride, and the handle responsibility in cornering, stiffish feeling and grip characteristics were evaluated by the test driver's feeling. The results are shown as an index based on the result of Example 1 regarded as 100. The larger the value, the better.

<Drainage Performance>

The above-mentioned test car was run on a 100 m radius circular asphalt road provided with a puddle having a depth of 10 mm and a length of 20 m with stepwise increasing the speed for entering into the puddle. The lateral acceleration (lateral G) was measured, and the average lateral G of the front wheels for the speed range of 50 to 80 km/h was calculated. The results are shown as an index based on the result of Example 1 regarded as 100. The larger the value, the better.

TABLE 1

|  | Com. Ex. 1 | Com. Ex. 2 | Ex. 1 | Ex. 2 | Ex. 3 |
| --- | --- | --- | --- | --- | --- |
| <Pattern> | FIG. 9(A) | FIG. 9(B) | FIG. 1 | FIG. 1 | FIG. 1 |
| <Connecting groove portion> | | | | | |
| Length L1 (mm) | — | — | 19.1 | 19.0 | 12.0 |
| <Center rib> | | | | | |
| Maximum width Wr2 of rib (mm) | — | — | 10.5 | 10.0 | 10.0 |
| Minimum width Wr1 of rib (mm) | — | — | 4.1 | 5.0 | 2.5 |
| Ratio Wr2/Wr1 | — | — | 2.6 | 2.0 | 4.0 |
| Length L2 of second oblique groove portion (mm) | — | — | 47.4 | 50.0 | 43.6 |
| Ratio L1/L2 | — | — | 0.40 | 0.38 | 0.27 |
| <Inner crown circumferential groove> | | | | | |
| Angle θ1 of upper wall portion (degree) | — | — | 60 | 60 | 60 |
| Angle θ2 of lower wall portion (degree) | — | — | 12 | 12 | 12 |
| Maximum wall width Ws1 (mm) | — | — | 3.0 | 3.0 | 3.0 |
| Minimum wall width Ws2 (mm) | — | — | 1.0 | 0.5 | 0.5 |
| Ratio Ws1/Ws2 | — | — | 3 | 6 | 6 |

TABLE 1-continued

| | Com. Ex. 1 | Com. Ex. 2 | Ex. 1 | Ex. 2 | Ex. 3 |
|---|---|---|---|---|---|
| Steering stability | 90 | 90 | 100 | 95 | 95 |
| Drainage performance | 95 | 95 | 100 | 95 | 95 |

What is claimed is:

1. A pneumatic tire including a tread portion provided with a pair of crown circumferential grooves which extend continuously and straightly in the tire circumferential direction on both sides of the tire equator to provide a center land portion between them, wherein said crown circumferential grooves comprise an inner crown circumferential groove which is located on the inside of the tire equator with respect to a vehicle when a tire is fitted to the vehicle, and an outer crown circumferential groove which is located on the outside of the tire equator with the fitted tire, a plurality of curved oblique grooves are provided in said center land portion at intervals in the tire circumferential direction, wherein each curved oblique groove extends obliquely from its outer end which opens at said outer crown circumferential groove, toward the inner side of the vehicle over the tire equator, turns toward the outer side of the vehicle at a closest approach location that the curved oblique groove makes the closest approach to said inner crown circumferential groove, and further extends obliquely up to its inner end located in said center land portion, said respective curved oblique grooves are connected with each other through connecting groove portions each extending in the tire circumferential direction from said inner end to an adjacent curved oblique groove adjoining in the tire circumferential direction, and said center land portion has a center rib which is defined by said connecting groove portions, portions of said curved oblique grooves each portion extending between said connecting groove portions, and said inner crown circumferential groove, and said center rib extends continuously in the tire circumferential direction while repeating increase and decrease of its axial width, and has a ratio of the maximum width to the minimum width within the range of 2.0 to 4.0, wherein said inner crown circumferential groove is a straight groove in which:

respective ridge lines at which both groove walls intersect with the tread surface, extend straight in the circumferential direction, the groove wall on the tire equator side includes a mildly-inclined upper wall portion which extends downward from the ridge line at an angle $\theta 1$ of 50 to 70° with respect to the normal line to the tread surface, and a steeply-inclined lower wall portion which is continuous with the lower edge of said upper wall portion and extends up to a groove bottom at an angle $\theta 2$ smaller than said angle $\theta 1$, and said upper wall portion extends in the circumferential direction with repeating increase and decrease of its axial wall width, and has the maximum wall width at a location at which the width of said center rib becomes minimum.

2. The pneumatic tire of claim 1, wherein the circumferential length L1 of each of said connecting groove portions is from 0.3 to 0.5 times the circumferential length L2 of said portion of said curved oblique groove which is located between said connecting groove portions.

3. The pneumatic tire of claim 1, wherein said tread portion is provided with:

an outer shoulder circumferential groove which extends continuously in the circumferential direction between said outer crown circumferential groove and a tread ground contact edge on the vehicle outer side, thereby forming an outer middle land portion between said outer shoulder circumferential groove and said outer crown circumferential groove, and an inner shoulder circumferential groove which extends continuously in the circumferential direction between said inner crown circumferential groove and a tread ground contact edge on the vehicle inner side, thereby forming an inner middle land portion between said inner shoulder circumferential groove and said inner crown circumferential groove, in which said inner middle land portion is in the form of a circumferentially continuous rib having no crossing lateral groove and no crossing sipe.

4. The pneumatic tire of claim 3, wherein a circumferentially continuous rib portion having no crossing lateral groove and no crossing sipe is disposed on the inside of said inner shoulder circumferential groove with respect to a vehicle so as to adjoin said inner shoulder circumferential groove.

5. A pneumatic tire including a tread portion provided with a pair of crown circumferential grooves which extend continuously and straightly in the tire circumferential direction on both sides of the tire equator to provide a center land portion between them, wherein said crown circumferential grooves comprise an inner crown circumferential groove which is located on the inside of the tire equator with respect to a vehicle when a tire is fitted to the vehicle, and an outer crown circumferential groove which is located on the outside of the tire equator with the fitted tire, a plurality of curved oblique grooves are provided in said center land portion at intervals in the tire circumferential direction, wherein each curved oblique groove extends obliquely from its outer end which opens at said outer crown circumferential groove, toward the inner side of the vehicle over the tire equator, turns toward the outer side of the vehicle at a closest approach location that the curved oblique groove makes the closest approach to said inner crown circumferential groove, and further extends obliquely up to its inner end located in said center land portion, said respective curved oblique grooves are connected with each other through connecting groove portions each extending in the tire circumferential direction from said inner end to an adjacent curved oblique groove adjoining in the tire circumferential direction, and said center land portion has a center rib which is defined by said connecting groove portions, portions of said curved oblique grooves each portion extending between said connecting groove portions, and said inner crown circumferential groove, and said center rib extends continuously in the tire circumferential direction while repeating increase and decrease of its axial width, and has a ratio of the maximum width to the minimum width within the range of 2.0 to 4.0, wherein said center land portion is provided with oblique sub-grooves each extending obliquely from said inner end of the curved oblique groove toward the outer side of a vehicle passing between the circumferentially adjacent curved oblique grooves.

6. The pneumatic tire of claim 5, wherein the circumferential length L1 of each of said connecting groove portions is from 0.3 to 0.5 times the circumferential length L2 of said portion of said curved oblique groove which is located between said connecting groove portions.

7. The pneumatic tire of claim 5, wherein said tread portion is provided with:

an outer shoulder circumferential groove which extends continuously in the circumferential direction between said outer crown circumferential groove and a tread ground contact edge on the vehicle outer side, thereby forming an outer middle land portion between said outer shoulder circumferential groove and said outer crown circumferential groove, and an inner shoulder circumferential groove which extends continuously in the circumferential direction between said inner crown circumferential groove and a tread ground contact edge on the vehicle inner side, thereby forming an inner middle land portion between said inner shoulder circumferential groove and said inner crown circumferential groove, in which said inner middle land portion is in the form of a circumferentially continuous rib having no crossing lateral groove and no crossing sipe.

8. The pneumatic tire of claim 7, wherein a circumferentially continuous rib portion having no crossing lateral groove and no crossing sipe is disposed on the inside of said inner shoulder circumferential groove with respect to a vehicle so as to adjoin said inner shoulder circumferential groove.

* * * * *